July 29, 1969  R. B. COOPER  3,458,050
FRUSTOCONICAL FILTER FITTINGS
Filed Sept. 10, 1968  2 Sheets-Sheet 1

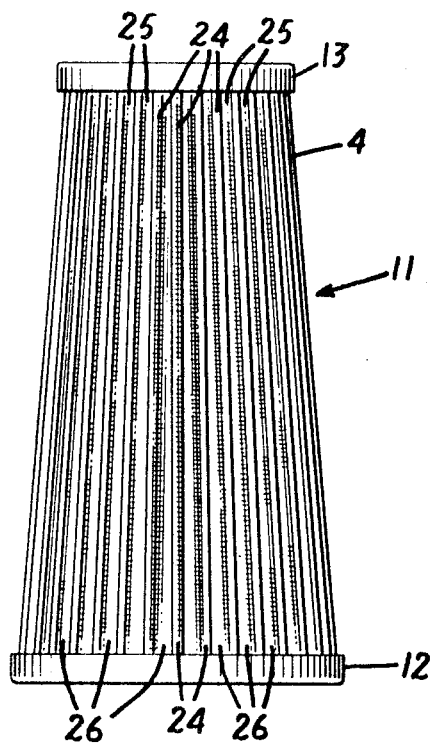

United States Patent Office 3,458,050
Patented July 29, 1969

3,458,050
FRUSTOCONICAL FILTER FITTINGS
Roydon B. Cooper, Locust Valley, N.Y., assignor to Pall Corporation, Glen Cove, N.Y., a corporation of New York
Continuation-in-part of application Ser. No. 524,915, Feb. 3, 1966. This application Sept. 10, 1968, Ser. No. 767,577
Int. Cl. B01d 35/28, 35/02
U.S. Cl. 210—448                                    10 Claims

ABSTRACT OF THE DISCLOSURE

A fitting is provided for connection to a standard fluid connector. The fitting incorporates a frustoconical corrugated wire mesh filter element disposed across the path of fluid flow through the fitting, with the sides of the filter element at an angle of from about 2.5° to about 22.5° to the axis of the filter. The corrugations run lengthwise of the filter element and are spaced closer together at the apex than at the base to provide uniform surface area over the entire length and increased strength.

---

This application is a continuation-in-part of Ser. No. 524,915, filed Feb. 3, 1966, now abandoned.

This invention relates to fittings for use in fluid lines having a filter disposed therein across the path of fluid flow through the fitting, and more particularly, to standard size filter fittings incorporating therein relatively fine corrugated wire mesh frustoconical filters designed for maximum utilization of a limited space.

In many fluid systems, there is a need to ensure freedom from suspended matter, despite the fact that only a very small amount of suspended matter is likely to be encountered. Fluids flowing through sensitive control and metering devices, such as servo valves, for example, are normally relatively clean, because of filter units elsewhere in the system, but in the device, if malfunction of the device is to be prevented, the fluid must be substantially free from dirt of a particle size that can be tolerated in other portions of the fluid system. Since only a small proportion of the total flow proceeds via the device, it is not practical to provide a filter in the main unit that is capable of removing dirt that affects the device. On the other hand, and especially in aircraft and missiles, where space and weight are at a premium, the provision of a full size filter unit just for the device is hardly warranted.

For this reason, fluid line connections have been supplied with fittings having a small disc filter, made of coarse wire mesh or a perforated plate, disposed across the line of fluid flow. It is, however, a difficult problem to interpose a filter, and especially a fine filter, in such a small space without interfering unduly with fluid flow. If the filter is small in surface area, it will create a relatively high pressure drop thereacross, which increases as the dirt is collected on the surface of the filter, and it will have a correspondingly low dirt capacity.

One approach to solve the problem is to provide higher surface area. However, it is difficult to fit a large surface area in the limited space available in a fitting without blocking valuable flow space inside the fitting, thus also increasing the pressure drop across the fitting.

The conventional approach to overcome the pressure drop problem utilizes a coarse filter medium, usually having a pore size greater than 150 microns, so that the fitting does not create a high pressure drop, and does not plug rapidly, but provides a correspondingly low level of filtration, thereby permitting the deterioration of the components of the device, due to the abrasion caused by the fine particles not trapped by the filter.

In accordance with this invention, a frustoconical filter of fine corrugated wire mesh, having pore openings of less than 150 microns, is disposed within a fitting suitable for connection to a standard MS, AN, SAE, or NPT fluid line connector. Normally, the narrow end or apex faces the fluid flow, and the filter cone has an included angle of at least 5°. The corrugations of the filter are spaced closer together at the apex than at the base, to obtain maximum filter surface area in a limited space, with a high dirt capacity and a minimum pressure drop across the filter, even at high rates of fluid flow. Due to the forming of the wire mesh into a corrugated filter having a conical shape, and the placement of the filter at an angle to the line of flow, a substantially larger area filter may be utilized and a consequent improvement in filter life is obtained, as compared to a disc or a cylindrical filter in the same fitting. The surface area of a filter can be increased more than five times by using a corrugated or pleated surface, as compared to a straight surface. Furthermore, the fine wire mesh filter medium having a pore size less than 150 microns, and preferably less than 50 microns, does not detract from the improved operating characteristics of the filter fitting.

With a cylindrical filter having either a flat or corrugated filter medium, it is not possible to maintain uniform flow through the entire filter element without special flow distributors being added to the unit. However, these flow distributors add greatly to the pressure drop of the unit and are therefore not acceptable for many applications.

If the flow through the filter is not uniform, the life of the filter will be lower than one in which uniform flow is maintained. This occurs because, as a filter plugs, the dirt collected in its pores partially blocks these pores, making the filter appear finer and causing it to remove fine particles that it ordinarily would pass. Since the rate of addition of dirt is proportional to the flow rate at any location on the filter, those locations with high local flow rates will plug rapidly, whereupon flow shifts to other locations, which then have high local flow rates, with consequent rapid plugging, etc. This causes a reduction in life of from about 10 to about 50% below that of an equivalent unit with uniform flow, depending on the distribution of contaminants in the fluid being filtered.

The corrugated frustoconical configuration of this invention permits the filter to be placed in the fitting so that the space between the filter surface and the inside wall of the fitting becomes less towards the base of the cone. By appropriate adjustment of this and the angle between the filter and the fitting wall, the flow rate can be kept relatively constant over the entire filter surface, thereby increasing the dirt capacity and minimizing the pressure drop. Furthermore, due to the corrugation spacing and shape, as will be described hereinafter, the area of the filter is uniform from apex to base of the filter. Due to the uniform surface area presented to the flow and the uniformity of flow through the filter, maximum filter life is ensured with a minimum pressure drop across the fitting.

Familiar pipe flow formulae are used to design the needed surface area for the frustoconical filter element, and to determine the correct dimensioning of the filter and the fitting for the given flow conditions and dirt removal requirements. If the amount of flow and dirt are variable, a certain amount of trial-and-error experimentation may be necessary to determine the correct parameters. A model can be prepared to confirm the accuracy of the calculations, but this is usually unnecessary. In many cases where such models were constructed and tested, the actual pressure drop across the filter fitting was less than that calculated for the same operating conditions. Given the input or flow volume and pressure, the viscosity and flow characteristics of the fluid to be filtered, and the pore size of the filter to meet dirt removal requirements, the determination of dimensional requirements is normally a matter of mathematical calculation.

The shape of the filter element which is incorporated in a fitting in accordance with this invention is conical, and preferably frustoconical, and presents the corrugated wire mesh filtering surface at an angle to the axis of the fluid flow passage of at least 2.5° (an included cone angle of 5°), up to about 22.5° and preferably between 5° and 10°. At beyond 22.5° and below 2.5°, the uniform flow pattern across the filter surface is disturbed, and the benefits of larger volume in a minimum space are also reduced.

The filter can be either a regular conic section or an irregular conic section, whereof the sides need not necessarily be straight, but can be convex or concave. A regular frustoconical filter element having straight sides is preferred, because it can most easily be manufactured, structural strength and rigidity can be uniformly maintained, and best flow characteristics are obtained. Also, the flow-through characteristics and proper positioning of the filter in the fitting are also more easily calculated and predicted in the case of regular conic filters.

The corrugated frustoconical filter element of this invention can be incorporated into the fluid fitting in a number of different ways, according to the design. It is of course essential that the base of the filter be attached to the fitting wall in a leak-tight seal. An annular retaining ring and seal, or a threaded ring and seal, to which the filter is attached, can be used. In this way, one or more filters can be removably inserted into one or more of the arms of an elbow, Y-gate, or cross fitting, and so positioned with respect to the direction of fluid flow that fluid passing therethrough is filtered. Such a filter or filters can be removed and cleaned, when necessary.

A preferred method of attachment useful for metal fittings is to spin or swage one end of the fitting over and around the base of the frustoconical filter element, permanently to retain the filter in the fitting, and to form a fluid-tight seal therewith without a gasket or sealing ring. In this case, the fitting and filler are replaced together. Welding, brazing and soldering also can be used.

Preferably, the fitting and the filter incorporated therein are made of the same or similar materials. Metals which can effectively be used include steel, corrosion-resistant steel such as stainless steel, bronze, brass, aluminum and aluminum alloys, nickel and chromium, and nickel-chromium alloys, copper and alloys of copper with other metals, as well as a large variety of other metals and metallic substances well known to those skilled in the art. Either the fitting or the filter, or both, can also be made either of thermoplastic and/or thermosetting resins, such as polyethylene, polypropylene, polyamides, polytetrafluoroethylene, polystyrene, polyvinyl chloride, polvinyl butyral, polyvinylidene chloride, phenol-formaldehyde polymers, urea-formaldehyde polymers, polyesters, polycarbonates and synthetic rubber, which can be molded into the desired filter and/or fitting.

The filter is made of wire mesh, and preferably metallic wire mesh. Suitable metallic and nonmetallic materials for the wires are listed above. It is desirable that the wires forming the mesh be bonded at their points of crossing, such as by sintering. A very satisfactory sintered mesh is described in U.S. Patents Nos. 2,925,650 and 3,049,796, and filters of this type are preferred for use in the filter-fittings of the instant invention. A corrugated frustoconical wire mesh filter in accordance with this invention can be constructed in accordance with the method described in U.S. Patent No. 3,007,238.

It is preferred that the filter medium have a smooth surface. Unevenness in the surface increases local turbulence and causes eddy currents around the pore openings, which interfere with the filtration characteristics and fluid flow along the upstream surface of the filter. A surface having the requisite smoothness can be obtained by rolling wire mesh screen and thereby flattening and integrating the wires at the surface at their crossover points, to form a plate, as in U.S. Patent No. 2,423,547 to Behlen. The rolled screen can also be sintered to bond the wires at their points of contact, as in U.S. Patent No. 2,925,650.

The corrugated wire mesh can be formed into a frustoconical shape in any of a number of ways, all of which are easily accomplished. A plain or straight-sided frustoconical filter element can be prepared by simply folding a corrugated wire mesh into a conical shape, lapping the free ends over a die or mandrel, and bonding them together by resistance welding, brazing, adhesive tape or interposed adhesive. The lapped ends can be brought together, and then folded back, or simply lapped over and sealed.

The frustoconical element can also be formed by forming the corrugated wire mesh into a tube or cylinder, sealing the side seam and then gently flaring the tube to the desired conical angle by forcing one end of the tube over a similar conical die. In either case, the blank of filter material should have a uniform width so that when formed into a cone, the corrugations at the flared end, which forms the base, are further apart and wider than the corrugations at the apex of the cone. Forming the corrugated wire mesh in this manner yields a frustoconical shaped element with uniform surface area long its entire length from the apex to the base. Therefore, since the flow is uniform through the filter and the surface area is uniform, there will be no tendency for one portion of the filter to clog due to less surface area at that point.

Furthermore, due to the fact that the corrugations are spaced closer together at the apex than at the base of the filter, it is possible, while still employing a frustoconical shape, to provide a high surface area at the apex of the filter as well as at the base. In fact, it is possible by the instant invention to provide a corrugated frustoconical filter element having the same overall surface area as a corrugated cylindrical filter element having the same base diameter. Moreover, the corrugated frustoconical filter element has the advantage that due to its shape, it will have a lower pressure drop than a corrugated cylinder having the same surface area and the same base diameter when employed in the same size fitting.

The corrugations and their spacing are also quite important to maintain the structural stability of the instant filter fitting. Inasmuch as the corrugations are spaced close together at the apex of the frustoconical filter, the corrugations tend to support each other, and the filter element is of far greater strength and rigidity than would otherwise be the case.

The open ends of the corrugated frustoconical element can be capped by flanged end caps, as in the case of tubular filter elements, except that in this case the cap at the base of the cone is, of course, of larger diameter than the cap at the apex. The cap at the apex will normally be solid, and the cap at the base end will have an aperture therethrough for passage of filtered fluid from the interior of the cone, connecting to the exit opening at that end of the fitting.

If desired for use in high pressure systems, the filter element can be supported upon or within an external or an internal support, or both. An internal support is normally referred to as a core support, and an external support as a cover support. The core or cover will provide additional physical resistance against deformation of the filter under high fluid flows or fluid pressures. The support will, of course, have a conical configuration, corresponding to that of the filter element, and it can be made of any sturdy material, with a sufficient number of openings thereto to pass the flow volume at the rates required. Perforated plates, apertured plates, and coarse screens of heavier wire than the material of which the filter element is made, are suitable materials. The support can be made of metal or plastic, as desired, and any of the plastics referred to above in conjunction with the filter element can be employed.

The frustoconical filter fittings of this invention can be made capable of passing a fluid flow ranging from 0.1 gallon per minute or less to 50 gallons per minute or more, and providing corrugated wire mesh filter medium for the removal of all particles larger than 150 microns and as fine as 98% removal of all particles larger than 1.5 microns under all flow conditions within this range. Filter fittings having operating pressures of up to 5,000 p.s.i., proof pressures of up to 7,500 p.s.i., and element collapse pressures of up to 7,500 p.s.i., and above, can be constructed.

The filter fittings disclosed herein can be made so that external dimensions conform with, among others, the appropriate MS, AN, SAE and NPT standards for fluid fittings for both aerospace and commercial applications. Filter fittings in accordance with this invention, therefore, enjoy an advantage with respect to their ease and versatility of use, because they can be used exactly as are fittings of the standard type and size used for connecting pipe, tube, hose, conduit, and other fluid lines of the various types, encountered, for example, in fuel systems, lubricating systems, hydraulic systems, and fluid control and circulating systems.

The fittings into which filters are incorporated in accordance with this invention include any of the known types of fittings, couplings, and unions, such as, for example, nipples, elbows, T-joints, cross-connections for junctures of four or more fluid lines, conduits, couplings, bushings, flanges, reducers, flow-through caps, bolts, unions, adapters and connectors.

By use of filter fittings in accordance with this invention both the weight and the space needed for introducing the necessary filters into fluid systems are greatly reduced. This saving in weight and space constitutes a particular advantage with respect to fluid systems for aircraft, missiles, submarines and all industrial uses where it is desirable to reduce the weight and bulk of fluid in hydraulic systems. Filters can be introduced into fluid systems in accordance with this invention without appreciably increasing the weight of the system, since the filter is incorporated into a coupling or union of standard size and weight. Couplings or unions are a necessary part of nearly all fluid systems in order to permit their assembly and disassembly. This invention permits a filter to be introduced between portions of the fluid system wherever a coupling or union is present without introducing an additional separate component into the fluid line. In this way, not only are weight and space saved, but the number of component parts making up the fluid system are not increased by the introduction of separate filter units into various portions of the system. This invention therefore makes it possible to reduce the structural complexity of fluid systems and the proliferation of the component parts thereof.

Fluid fittings suitable for having corrugated frustoconical filters integrally incorporated therein, in accordance with this invention, can vary in size from an inside diameter of about 1/16 inch and smaller, to an inside diameter of about 3 inches and larger. The fittings can be provided with a coupling means such as internal or external threads, conical connections, bayonet joints, clamps, and pressure rings, adapted for coupling to or with straight or conical tubes, pipes, hoses, or other conduits. Different end portions of the fitting can be provided with the same or different coupling means, which coupling means can include simple friction couplings.

The drawings illustrate preferred embodiments of the invention.

FIGURE 5 is an enlarged side view of the corrugated frustoconical filter element shown in the fitting in FIGURES 1 and 2.

Figure 1:
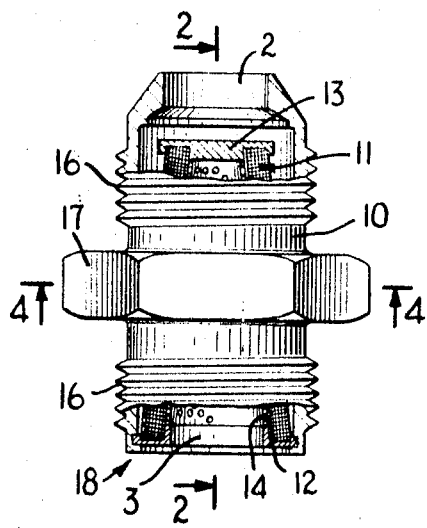
FIGURE 1 shows a filter fitting in accordance with the invention, in perspective and with parts broken away, for clarity.
Figure 2:
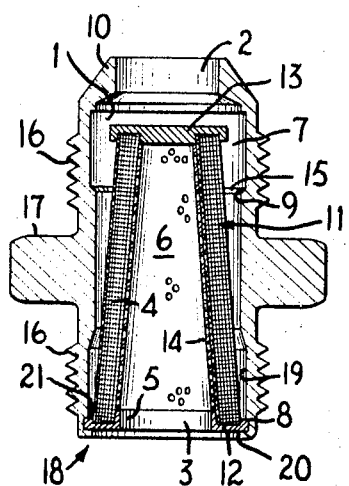
FIGURE 2 is a longitudinal section through the filter fitting of FIGURE 1, taken along the line 2–2 and looking in the direction of the arrows.

The filter fitting of FIGURES 1 through 5 is in the form of a union 10 having a central passage 1 extending therethrough, open at both ends, with fluid ports 2 and 3 at each end. Normally, port 2 serves as the fluid inlet, and port 3 as the fluid outlet, but these functions can be reversed, according to the direction of flow desired, and whether the filter is to remove suspended matter on its external surface or on its internal surface.

The fitting is provided with external threads 16 at each end inwardly of the ports, for the reception of line connections. A central flange 17 in the form of a hexagonal nut is provided to facilitate tight connection of the fitting to the fluid lines.

Figure 3:
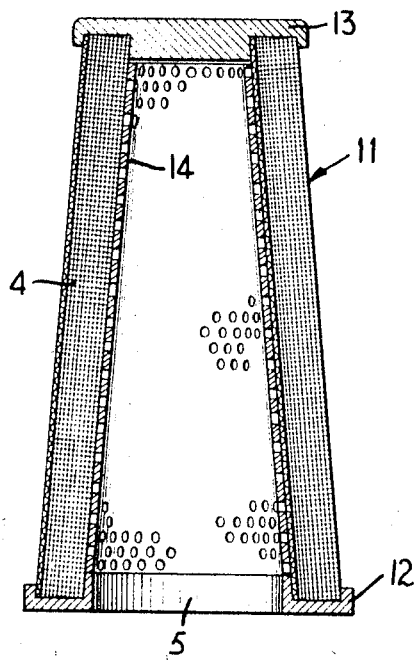
FIGURE 3 is an enlarged view of the corrugated frustoconical filter element shown in the fitting in FIGURES 1 and 2.
Figure 4:
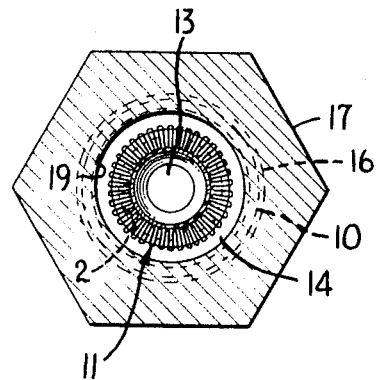
FIGURE 4 is a cross-sectional view of the fitting of FIGURE 1, taken along the line 4—4 and looking in the direction of the arrows.

The filter element 11 of FIGURES 1 to 5, best seen in FIGURES 3 and 5, is a truncated cone, the sides of which are formed of a corrugated and sintered stainless steel wire mesh 4, with an included angle of 10°. The open ends of the truncated cone are each fitted with end caps 12 and 13, which embrace the corrugations of the wire mesh. The ends of the mesh are attached to the end caps in a leakproof seal by brazing, but soldering, welding or epoxy resin bonding can also be used. It will be noted that the end cap 13 closes off the apex of the cone, while the end cap 12 at the base of the cone is provided with a central opening 5 for passage of fluid into and out from the open interior 6 of the filter element.

The end cap 12 is dimensioned at its external periphery to fit tightly against a ledge 8 in the inside wall 19 of the fitting, just inside port 3, and the end of the fitting wall 20 is swaged over the end cap 12, so as to retain the filter element tightly in place in the central passage 1 of the fitting. An annular spider 15 seated against a ledge 9 in the internal wall of the fitting centers the apex of the cone in the passage 1, defining an annular passage 7 externally of the filter element, between the filter element and the inside wall 19 of the fitting. It will be noted that the annular passage 7 tapers, narrowing towards the base of the cone, and terminates at 21 against the inside face of the end cap 12. Since the end cap 12 engages the fitting wall in a leakproof seal, it is evident that all fluid passing through the central passage 1 of the fitting must pass through the filter, no matter in which direction fluid flow proceeds.

A perforated sheet metal core 14 of stainless steel is disposed internally of the corrugated wire mesh 4, for structural support, and is retained within the filter element by the end caps 12 and 13. An internal core is required for fluid flow in the direction of port 2 to port 3, but if the fluid flow is in the opposite direction, then it would be desirable to provide an external cover for structural support, and the internal core can be omitted. If flow is bidirectional, both internal and external supports can be provided.

In FIGURE 5, the corrugations of the wire mesh 4 can be clearly seen. The corrugations 24 of the wire mesh 4 extend the entire length of the frustoconical element 11 from the apex to base. The corrugated wire mesh 4 is made from a rectangular blank. Thus the filter has the same area at the apex as at the base. The spacings 25 between the corrugations 24 at the apex of the cone, therefore, are narrower than the spacings 26 at the base. The corrugation height is the same along the entire length of the element as shown in FIGURE 3. By this configuration uniform surface area is thereby assured. In addition, the corrugations adjacent the apex tend to support each other thus improving the strength of the filter.

In operation, fluid flow entering through the port 2 serving as the inlet encounters the blind face of the end cap 13, and is directed to the passage 7 annularly surrounding the external periphery of the filter element 11. Fluid passes through the mesh 4, and because of the disposition of the filter across the line of fluid flow with the larger dimension at the base end of the cone, flow passes uniformly through the filter. In addition, due to the uniform surface area of the filter from the apex to the base thereof, no portion of the wire mesh tends to collect suspended matter filtered out from fluid passing through the filter more rapidly than any other portion. The suspended matter thus accumulates uniformly over the filter, and gradually fills in the pores until the filter is eventually clogged, providing optimum filter life.

Fluid passing through the filter proceeds via the perforations of the core 14 into the internal passage 6 of the filter, and then passes through the central opening 5 of the end cap 12 and the port 3 serving as the outlet. Passage 6 is generally conical, being widest at the central opening 5 of end cap 12 and terminating in an apex at end cap 13.

If the port 3 is used as the inlet and port 2 as the outlet, then fluid flow is via port 3 and opening 5 into the internal passage 6 of the filter. Fluid flows through the perforations of the core 14 and the corrugated wire mesh 4, and thence via passage 7 to the port 2, whence it emerges from the fitting.

In a fluid fitting, it is quite difficult to obtain a uniform and efficient flow distribution at every portion of the surface of a filter, due to its small size and because the loss of fluid through the filter introduces a pressure drop which increases gradually along the filter from the first portion towards the last portion of the filter encountered by the fluid. This results in an increased pressure drop and decreased dirt capacity. The higher the flow rate through the filter, the more pronounced this effect becomes. In the filter fittings of the invention, an increased dirt capacity and minimum pressure drop across the filter can be achieved, as shown in FIGURES 1 to 5, by setting the angle of the cone sides to diminish the volume of the annular passage surrounding the filter to match the pressure drop in the fluid flow along the filter and by providing corrugated wire mesh in which the spacing between the corrugations is closer together at the apex of the cone than the base to ensure uniform surface area.

An annular passage can be diminished in volume towards the end of the filter by decreasing its width, from 360° to less than that, or its height, as shown in FIGURES 1 to 5, or both. It can, for example, be in the form of a truncated regular cone or a truncated elliptical cone. The annulus may extend from a maximum width of 360° to any smaller size, according to the filter and flow requirements.

Having regard to the foregoing disclosure, the following is claimed as the inventive and patentable embodiments thereof.

1. A frustoconical filter fitting suitable for connection to a standard fluid connector, comprising, in combination, a fluid fitting having external dimensions suited for connection to said standard connector; a fluid passage therethrough; a corrugated frustoconical wire mesh filter element of uniform surface area from apex to base and axially disposed in the fluid passage in the fluid fitting across the line of fluid flow in a manner such that all fluid passing through the fluid fitting must pass through the filter element, said wire mesh having a pore size of less than about 150 microns; said corrugation being disposed lengthwise of the filter element and at an angle of from about 2.5° to about 22.5° to the axis of the filter element, and being spaced closer together adjacent to the apex than adjacent to the base of the filter element; the filter element reducing the fluid passage externally thereof to a tapered annulus diminishing in volume from the apex towards the base of the filter element.

2. A frustoconical filter fitting in accordance with claim 1 wherein the wires of the mesh are sinter-bonded together.

3. A frustoconical filter fitting in accordance with claim 1 including a support core disposed within the element to provide structural rigidity therefor.

4. A frustoconical filter fitting in accordance with claim 1, wherein the wall of the fitting is formed over one end of the filter element to hold it in a leak-tight seal against a fitting wall.

5. A frustoconical filter fitting in accordance with claim 1, in which the filter has a relatively smooth surface.

6. A frustoconical filter fitting in accordance with claim 1, in which the fitting is a union.

7. A frustoconical filter fitting in accordance with claim 1, in which the fitting has coupling means on each end thereof.

8. A frustoconical filter fitting in accordance with claim 7, in which the coupling means are threads.

9. A frustoconical filter fitting in accordance with claim 1, in which the fitting has a central flange comprising a nut.

10. A frustoconical filter fitting in accordance with claim 1, in which end caps are provided to close off each open end of the filter element, one end cap having a central opening and being held in a leak-tight seal against a fitting wall, so that all fluid passing through the fitting must pass through the wire mesh filter material.

References Cited
UNITED STATES PATENTS
| | | |
|---|---|---|
| 1,150,910 | 8/1915 | Warmington. |
| 2,843,218 | 7/1958 | Kiekhaefer. |
| 3,007,579 | 11/1961 | Pall _____ 210—493 X |

FOREIGN PATENTS
| | | |
|---|---|---|
| 719,937 | 12/1954 | Great Britain. |
| 891,854 | 4/1962 | Great Britain. |
| 503,021 | 1954 | Italy. |

REUBEN FRIEDMAN, Primary Examiner

C. M. DITLOW, Assistant Examiner

U.S. Cl. X.R.

210—452, 457, 493